(No Model.) 2 Sheets—Sheet 1.

F. B. GRISWOLD.
PNEUMATIC TIRE.

No. 596,700. Patented Jan. 4, 1898.

WITNESSES:
O. H. Haywood
H. R. Holler

INVENTOR
Frank B. Griswold
BY
Park Benjamin
his ATTORNEY (No Model.) 2 Sheets—Sheet 2.

F. B. GRISWOLD.
PNEUMATIC TIRE.

No. 596,700. Patented Jan. 4, 1898.

WITNESSES:
O. H. Hayward
H. R. Moller

INVENTOR
Frank B. Griswold
BY
Park Benjamin
his ATTORNEY

UNITED STATES PATENT OFFICE.

FRANK B. GRISWOLD, OF TROY, NEW YORK.

PNEUMATIC TIRE.

SPECIFICATION forming part of Letters Patent No. 596,700, dated January 4, 1898.

Application filed January 2, 1897. Serial No. 617,758. (No model.)

*To all whom it may concern:*

Be it known that I, FRANK B. GRISWOLD, of Troy, Rensselaer county, New York, have invented a new and useful Improvement in Pneumatic Tires, of which the following is a specification.

My invention relates to mechanical means for securing pneumatic tires upon the rims of wheels of vehicles, such as bicycles, light carriages, &c.

By "tire" I mean the tire of rubber or other suitable material which bears directly upon the surface whereon the vehicle runs.

By "tubular" I mean a tire everywhere in closed-tube or substantially closed-tube form when in place on the rim.

By "pneumatic" I mean a tire as aforesaid inflated by compressed air. That air may be inclosed in a separate inner tube or in one or more internal chambers or in any other way confined within the tire so as to properly distend it.

By "ordinary concave rim" I mean a felly or wheel-rim of wood, metal, or other suitable material not made of any specific form designed to coöperate with the tire or with any holding device or means therefor, but simply sufficiently concave on its exterior periphery to permit the tire to become seated therein and so prevented from sidewise movement.

By "mechanical means" I mean a positively-acting device directly holding the tire upon the rim irrespective of any like effect exerted by the expansive quality of confined air or the elasticity of rubber or similar material.

Figure 1:
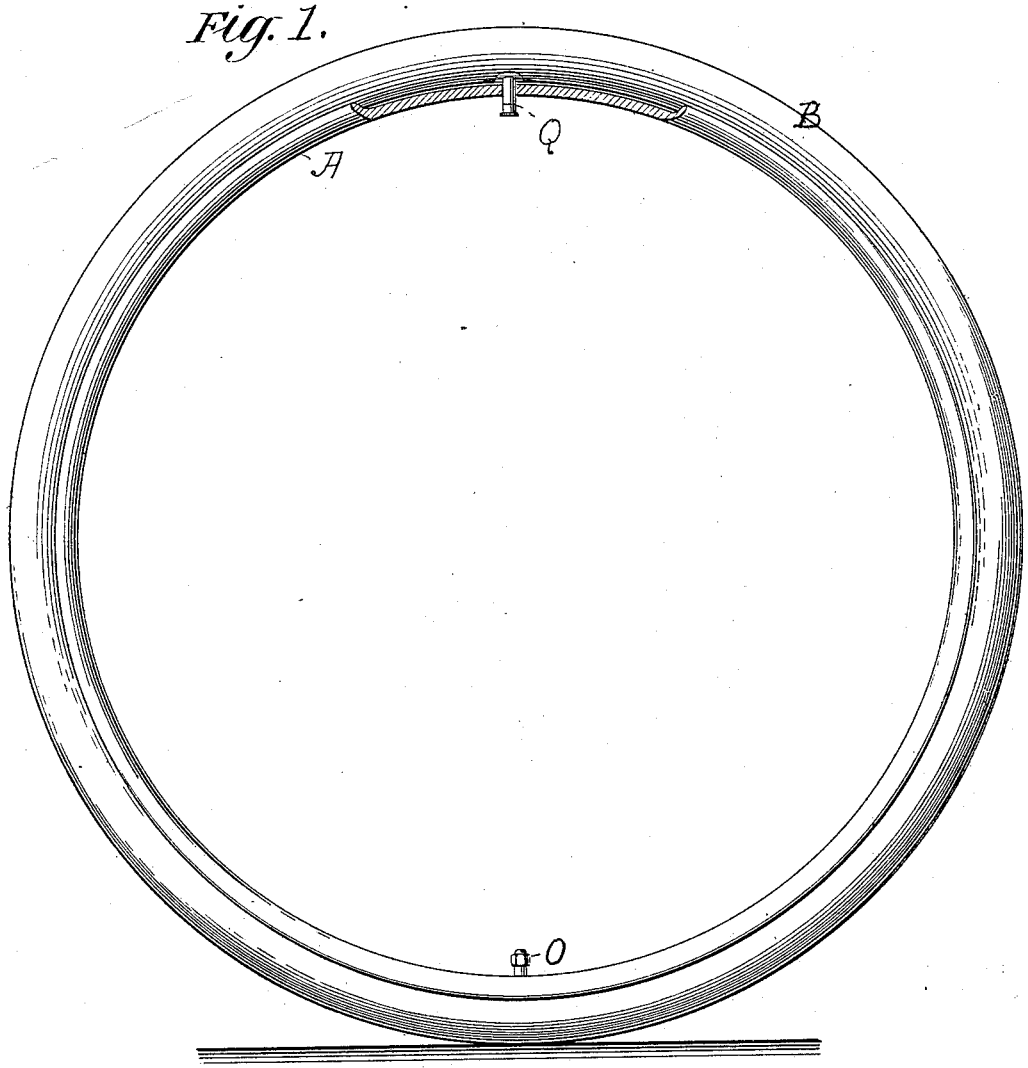
Figure 2:
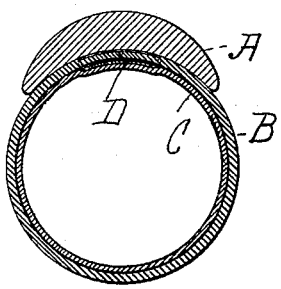
Figure 3:
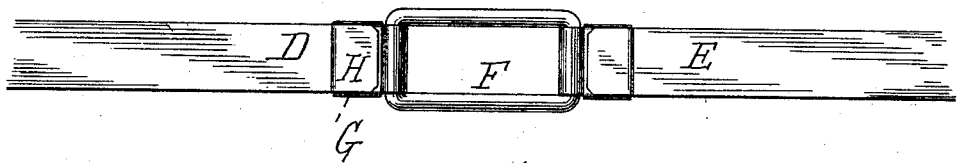
Figure 4:
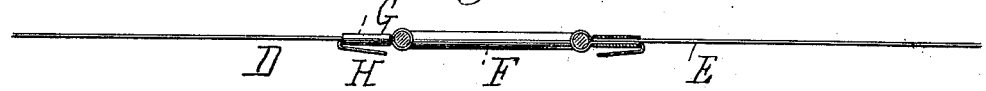
Figure 5:
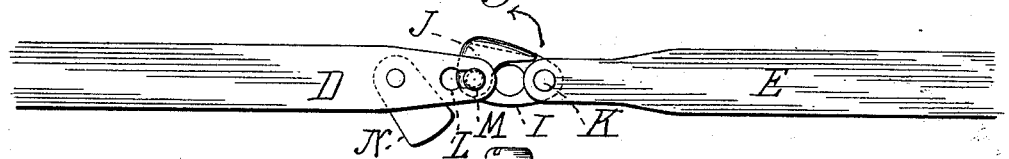
Figure 6:
Figure 7:
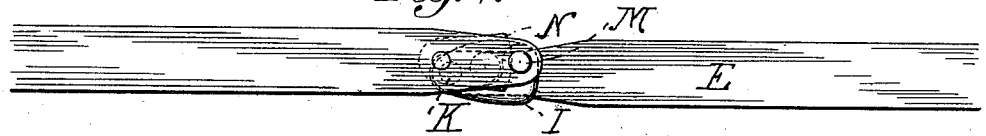
Figure 8:
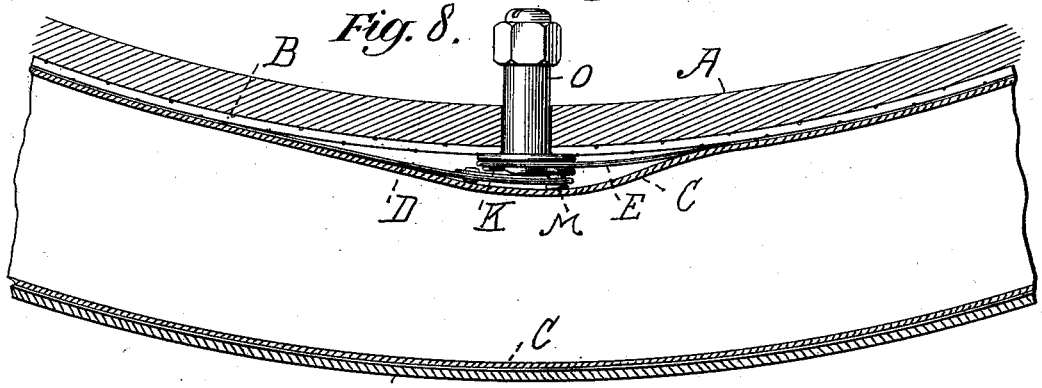

In the accompanying drawings, Figure 1 is a side elevation and partial section of my device in place upon a wheel-rim. Fig. 2 is an enlarged transverse section of tire and rim. Fig. 3 is a detail view of the link connection between the parts of the binding-band through which the tube of the air-valve passes. Fig. 4 is a side view of the same, showing the mode of connecting the band to the link in section. Fig. 5 is a plan view of the under side of the adjustable connection between the ends of the band, showing the parts thereof in the position they take before the rod is turned to tighten the band upon the rim. Fig. 6 is a side view of the same. Fig. 7 is a view similar to Fig. 5, showing the parts of the adjustable connection in the position they take after the band is tightened. Fig. 8 is an enlarged longitudinal section of my device in place on the wheel, with the parts of the adjustable connection in the position represented in Fig. 7.

Similar letters of reference indicate like parts.

A is the wheel-rim, which may be of metal, but which is preferably of wood. Any known construction of it may be adopted. It is to be noted, however, that I here show and can successfully employ the ordinary concave wood rim such as now generally used on bicycles without any special conformation or construction of said rim to adapt it specifically to receive my device.

B is a tubular tire.

C is an inflatable tube placed within the tire B and provided with an air-valve Q of any suitable construction. The valve-body, as usual, passes through the tire B and through an opening in the rim A.

The particular type of tire here shown for purposes of illustration is the well-known form which has its tubular tire B provided with a longitudinal slit or slits on the inner side, through which slit or slits the inner inflatable tube C is introduced, the slits being afterward closed by a lacing. This tubular tire is ordinarily attached to a concave rim by cement.

With this tire or any other suitable form of pneumatic tubular tire I employ no cement, but I secure it detachably to the ordinary concave rim by the device now to be described.

I provide a band preferably made in two pieces D and E. This band may be of any strong light flexible material. I prefer metal, such as thin sheet-brass. One end of each piece is connected to a metal link F. The connecting device herein represented is a flat sleeve G, through which the end of the band is passed, said end being then carried around the link-bar and again passed through the sleeve and finally bent back on the outside of the sleeve, as represented at H. In practice the sleeve G is first placed upon the band some distance back from the end. The end is carried around the link-bar and laid parallel to the body of the band. The sleeve is slid up over both parts and the extremity H is bent back. By turning the extremity H into its original position the sleeve can readily be slid rearward and the band can be readily adjusted upon the link-bar, so as to make the lapping-over end longer or shorter. In this way the total length of the two pieces of the band can be adjusted so as to adapt the band to wheels of any size.

Between the ends of the parts D and E of the band which are not connected to the link F is interposed the tightening device. This consists of a plate I of metal, having a flange J extending parallel to one face thereof. Said flange may be formed integrally with plate I by bending or by forming the plate and flange in one thick piece and cutting a recess between them. The width of said recess is a little more than the thickness of the band, so that the band can enter it freely.

The part E of the band is permanently pivoted at K to the under side of the piece I. In the end of the part D of the band there is an elongated opening which is larger at its inner end L. The opening at L passes over the head of a fixed pivot-pin M on the under side of the plate J. Then, the part D being drawn rearward, the narrow part of the opening L receives the pin M, and the band is held on the pin by the head of the pin. In order to prevent the part D moving forward, so as to bring the pin once more into the large part L of the opening, I pivot to said part a latch N, which being turned in line with the band bears against the pin M, as shown in Fig. 6. By moving the latch N into the position shown in Fig. 5 the part D of the band can at any time be released from the pin M.

Preferably formed integrally with the plate I is a projecting rod O, having a polygonal head P for the reception of a wrench or turning-key.

I will now describe the manner in which the band is applied to the tire and its mode of operation.

Referring to the kind of tire which has already been noted, the part D of the band, being released from the pin M, is inserted into the slit in the inner side of the tire, between the tire and the inner inflatable tube, and is then pushed completely around until it comes out again at the same slit. This end D is then connected to the pin M and secured. The rod O passes through the tire-slit, while the body of the valve C passes through the link F and also through the tire B, as usual. One object, therefore, of providing the link F is to allow the valve-body C to pass through it. Of course any possible movement of the band circumferentially around the wheel is limited by the length of the link F, which surrounds the valve-body C. The slit or slits in the tire are then laced up in the ordinary way and the tire is ready to be applied to the rim. The rim ordinarily has an opening through it to receive the valve-body C. I make another opening of similar character preferably diametrically opposite that for the valve, through which passes the rod O. This is clearly shown in Fig. 1. The tire is now applied to the rim, but it is loose. In order to secure it firmly in place, it is necessary to tighten the band D E, and this is done by applying a wrench or key to the polygonal head P of the rod O and rotating said rod in the direction of the arrow shown in Figs. 5 and 6 until the parts come into the position represented in Figs. 7 and 8. This is done by a half-rotation of the rod, causing each of the pivot-pins M and K to move over an arc of one hundred and eighty degrees. The end of the part E of the band then comes into the recess between the plate I and flange J. The two parts D and E of the band then are in positions which overlap, as clearly shown in Figs. 7 and 8. The connecting device I J is therefore substantially a double or compound crank, to the extremities of which the ends of the band are connected. By reason of this drawing of the ends together and their overlapping the band is sufficiently tightened to hold the tire B firmly upon the wheel. It is of course to be understood that the adjustment of the parts D E as to length in the link F is to be such as that the tightening operation through the turning of the rod O will be sufficient to cause the band to bind with suitable firmness. When this is done, the tire is held tightly in the concavity of the rim and will not come off under all ordinary conditions of use; but by simply turning the rod O in the reverse direction the band is loosened and the tire may be readily removed. It will be seen, therefore, that the tire is easily adjusted in place and tightened, and with equal ease may be taken off the rim. After the tire is secured in place the inner tube is inflated through the valve in the usual way. The inflated tube then presses by the expansive force of the air upon the band, thus aiding in holding it in position.

The tightening device has no tendency, by reason of its construction, to return to its original position after it has once been operated to constrict the band upon the tire, owing to the direct pull of the band upon the pivot-pins; but even if it had such tendency this would be prevented by the pressure of the inflated tube upon it. A tire thus secured in place cannot possibly creep around the rim. This is prevented by the rigid rod O, which passes through the outer tire and through the rim, also by the strong constriction of the band, and also by the pressure of the inflated tube in close frictional contact everywhere against the band. These facts have been proved by actual tests prior to this application.

An especial advantage follows from the attachment of both parts D and E of the band to the link F in that the length of each part of the band may be adjusted separately, and as a consequence of this, no matter how much the total length of the band may be shortened, the relative position of the rod O and the valve-body C diametrically opposite one another need not be changed. Thus if, for example, it was desired to make the total length of the band one inch shorter, if only one part of the band were taken up one inch at the link obviously that part would be one inch shorter than the other part, and hence the valve-body C and the rod O could not remain directly opposite each other and fit in the holes provided for them in the rim; but by taking up each part of the band a half inch it is obvious that no relative change in position of the valve-body C and the rod O will follow.

I desire it to be distinctly understood that my invention is not limited to use with the particular form of tire here exhibited for purposes of illustration. I may attach it to any tire in which it may operate substantially in the manner before set forth.

It will be observed that the interval or recess between the flange J and the plate I is no more than is necessary to accommodate the thickness of the band which enters it. Therefore the projection of the flange J beyond the plate I is quite small, and the inflatable tube readily adapts itself thereto. It is preferable to round the edges of the plate J, so that it may not cause any wear of the inside tube.

I claim—

1. A band-tightening device comprising a plate, a flange on said plate, extending parallel to one face thereof, means for securing the ends of said band respectively to the corresponding faces of said plate and said flange, and means for rotating said plate in its own plane, substantially as described.

2. A band-tightening device comprising a plate, a rigid rod concentric therewith, and projecting from one face thereof, a flange on said plate extending parallel to the other face thereof, and means for securing the ends of a band respectively to corresponding faces of said plate and said flange, substantially as described.

3. A band-tightening device, comprising the plate I, rod O projecting from one face thereof, flange J on the opposite face, and means for securing the ends of a band respectively to plate I and flange J, substantially as described.

4. The combination of a band, a plate, a flange on said plate, extending parallel to one face thereof, and a rigid rod concentric with said plate and projecting from the opposite face thereof, whereby said plate may be rotated in its own plane; the ends of said band being eccentrically pivoted upon corresponding faces respectively of said plate and said flange, substantially as described.

5. The combination with a binding-band of a shaft or rod, a double crank carried thereby, and having its arms in different planes, and a band having its extremities respectively pivoted to said arms; whereby when said crank is rotated the said band is constricted and the ends caused to overlap, substantially as described.

6. The combination of a wheel-rim, a tubular pneumatic tire, an inner inflatable tube, an air-valve therefor, a binding-band in two pieces, D and E, a link F, to opposite end bars of which link said pieces are connected; the said band being interposed between said tire and said inflatable tube, and the body C of said band extending through said tire said link and said rim, substantially as described.

FRANK B. GRISWOLD.

Witnesses:
H. R. MOLLER,
I. A. VAN WART.